Oct. 26, 1937.     R. R. THOMPSON     2,096,867
LOW FREQUENCY OSCILLATOR WITH NEGLIGIBLE RESISTANCE
Filed Sept. 26, 1934
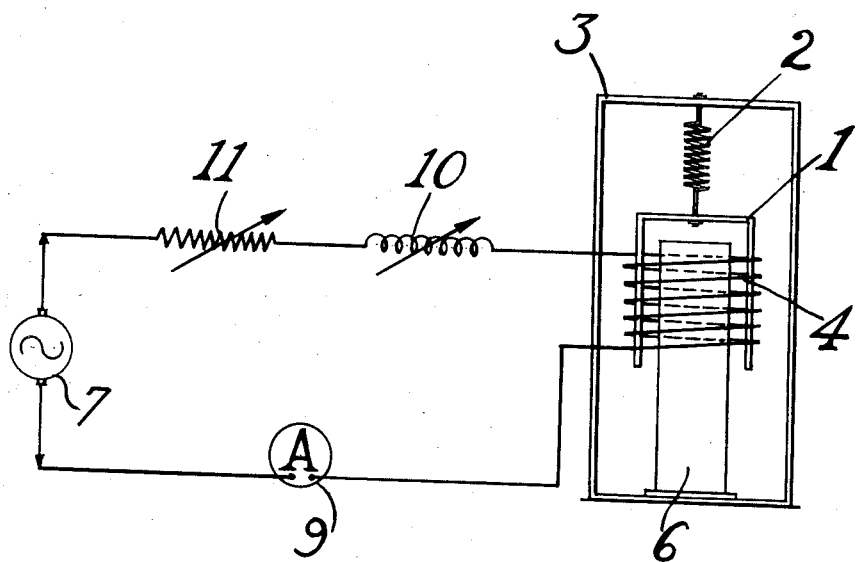
Robert R. Thompson Inventor
By P. L. Young Attorney Patented Oct. 26, 1937

2,096,867

UNITED STATES PATENT OFFICE 2,096,867

LOW FREQUENCY OSCILLATOR WITH NEGLIGIBLE RESISTANCE

Robert R. Thompson, Houston, Tex., assignor to Standard Oil Development Company, a corporation of Delaware Application September 26, 1934, Serial No. 745,565

3 Claims. (Cl. 178—44)

This invention relates to an improved method and apparatus for overcoming resistance in electrical systems and for overcoming damping in mechanical systems.

It is known that the construction of low frequency oscillators is attended with difficulties because of the fact that as the frequency is decreased the ratio of the resistance to the reactance of coils increases, thus resulting in a broad resonance peak for the system, which broad resonance peak prevents sharp tuning. These difficulties are not as great in the case of mechanical systems as in the case of electrical systems, but they are formidable as a rule never-the-less.

It is an object of this invention to overcome the above mentioned difficulties and to permit of building electrical or mechanical oscillators, either low or high frequency, with zero or negligible resistance or damping.

The invention will be fully understood from the following description taken in connection with the accompanying drawing in which latter the figure is a schematic representation of a preferred apparatus for carrying out the invention.

Referring particularly to the drawing a mechanical oscillatory system is shown comprising a coil frame 1 which is suspended by means of a helical spring 2 from a supporting case 3. A coil 4 is wound upon the coil frame 1. If desired the helical spring 2 can be replaced by a leaf spring and some of the advantages will be retained. A magnet 6 is supported by the case 3 inside of the coil frame 1. There is thus provided a mechanical oscillatory system of predetermined frequency operative to produce a varying current of electricity. While the magnet 6 has been described as the stationary system and the coil 4 as the oscillatory element it will be understood that the magnet 6 can be resiliently suspended and the coil 4 can be rigidly supported and some of the advantages of the invention will be retained. The elements 1 to 6 inclusive constitute a vibratory system.

An electrical circuit is connected to the mechanical vibratory system through the inductance coil 4. The electric circuit includes a source of oscillating current 7 and an ammeter 9. A variable inductance 10 and a variable resistance 11 are connected in series in the circuit.

Computation shows that the current I is:

$$I = \frac{E}{\left[R - \frac{K^2 r w^2}{(k - M w^2)^2 + r^2 w^2}\right] + jw\left[L - \frac{K^2(k - M w^2)}{(k - M w^2)^2 + r^2 w^2}\right]}$$

where $E$ = electro-motive force applied at 7
$R$ = the resistance 11 plus the resistance of the coil 4 wound on frame 1
$K$ = the ratio of the electro-motive force induced across coil 4 to the velocity of vibration of the coil 4 relative to the magnet 6
$r$ = the damping of the mechanical system consisting of the spring 2 and coil 4
$w$ = the impressed frequency multiplied by $2\pi$
$k$ = the spring constant of spring 2 expressed in dynes per centimeter extension of the spring
$M$ = the mass of the coil 4
$L$ = the sum of inductance 10 and the inductance of the coil 4

Finally $$j = \sqrt{-1}.$$

Thus it is seen that the current I can be made large by adjusting the constants in the denominator of the above equation so that the two factors approach zero. Since R is the sum of the resistance 11 and the resistance of the coil 4, we see that the factor subtracted therefrom represents a negative resistance which has been introduced into the electrical circuit by the coupling to the mechanical system. Also, since L represents the total inductance of the circuit, it is seen that the factor following L in the denominator of the above equation represents a negative reactance for all frequencies less than $$\sqrt{\frac{k}{M}}$$

which is the natural frequency of the mechanical system.

It is possible, therefore, with this device, to construct resonant electrical circuits with very small decrement at very low frequencies. Conversely, it is also possible with this device to construct a very sharply resonant mechanical system.

Resistance is overcome in the electrical system or damping is overcome in the mechanical system by electrically connecting the electric circuit with the mechanical vibratory system and adjusting the constants of the electrical and mechanical systems so as to introduce negative electrical resistance and/or negative damping which cancel the electrical resistance of the electrical system and/or the mechanical damping of the mechanical system.

By the construction described the electrical circuit and the vibratory mechanical circuit are coupled in such a way that a current in the electrical circuit produces vibration in the mechanical circuit, or vibrations of the mechanical circuit produce currents or voltages in the electrical circuit. The impedance to currents in the electrical circuit is thereby changed in such a way that negative resistances, and positive or negative reactances will be introduced; and the impedance to motion of the mechanical circuit is changed so that negative mechanical resistances, and negative or positive mechanical reactances are introduced into the mechanical circuit by the currents which flow in the electrical circuit.

Various changes may be made within the scope of the appended claims in which it is desired to claim all novelty inherent in the invention as broadly as the prior art permits.

I claim:

1. A system, comprising a source of alternating current disposed in an electric circuit, a mechanical vibratory system including a magnet of fixed strength, an inductance coil, means supporting the magnet and inductance coil to permit oscillatory movement relative to each other, the inductance coil being connected in the electric circuit, an inductance and a resistance connected in series in the electric circuit, and means for relative adjustment of the constants of the electric circuit and of the mechanical system.

2. A system, comprising a source of alternating current disposed in an electric circuit, a mechanical vibratory system including a magnet of fixed strength, an inductance coil, means resiliently suspending the coil for movement with respect to the magnet to permit the coil to oscillate with respect to the magnet, the inductance coil being connected in the circuit, an inductance and a resistance connected in series in the circuit, and means for relative adjustment of the constants of the electric circuit and of the mechanical system.

3. A system, comprising a source of alternating current disposed in an electric circuit, a mechanical vibratory system including a magnet of fixed strength, an inductance coil, means resiliently suspending the coil to permit oscillatory movement with respect to the magnet, the inductance coil being connected in the circuit, and a variable inductance and a variable resistance connected in series in the circuit for relative adjustment of the constants of the electrical circuit and of the mechanical system.

ROBERT R. THOMPSON.